Dec. 7, 1965  D. F. WHITE  3,221,662
METHOD AND APPARATUS FOR CONTROLLING
FLOW IN CENTRIFUGAL MACHINES
Filed Feb. 14, 1963  10 Sheets-Sheet 1
Fig. 1.
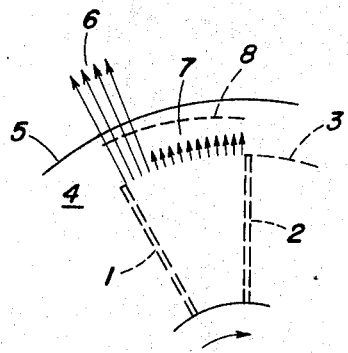
Fig. 2.
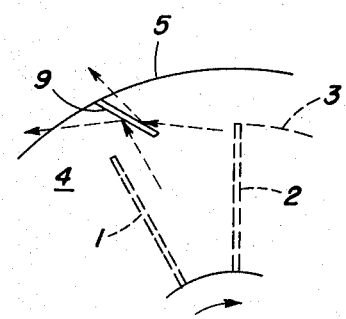
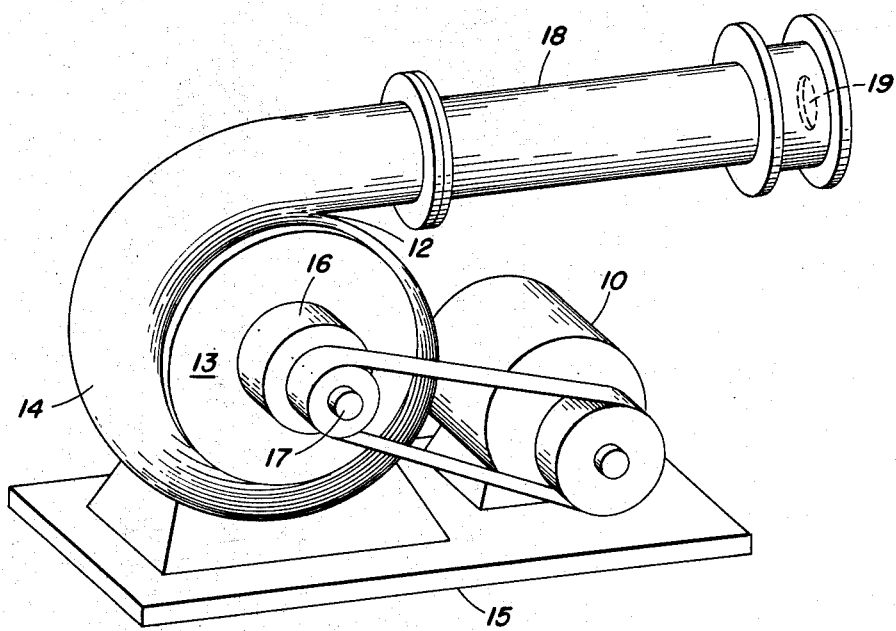
Fig. 3.
INVENTOR
Douglas Frank White
BY
ATTORNEY

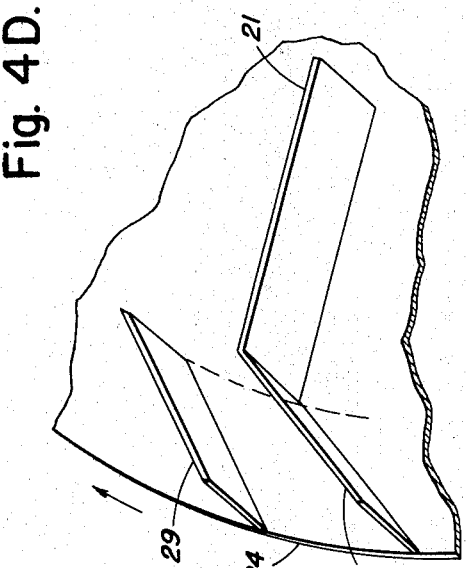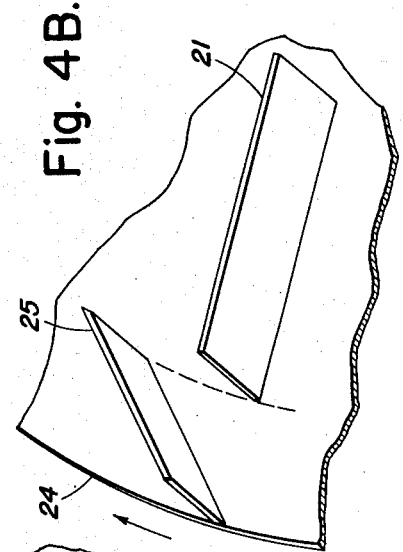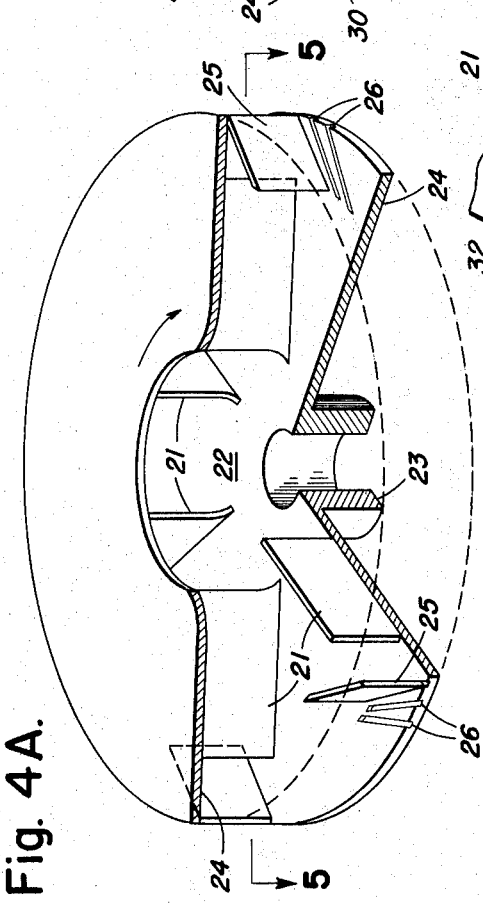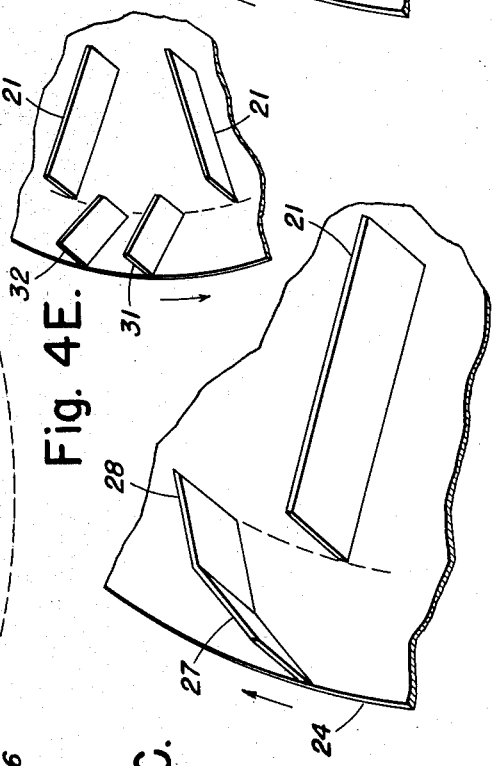

INVENTOR
Douglas Frank White

Dec. 7, 1965    D. F. WHITE    3,221,662
METHOD AND APPARATUS FOR CONTROLLING
FLOW IN CENTRIFUGAL MACHINES
Filed Feb. 14, 1963    10 Sheets-Sheet 9

INVENTOR
Douglas Frank White
BY
Tennes J Erstad
ATTORNEY

Dec. 7, 1965 D. F. WHITE 3,221,662
METHOD AND APPARATUS FOR CONTROLLING
FLOW IN CENTRIFUGAL MACHINES
Filed Feb. 14, 1963 10 Sheets-Sheet 10

INVENTOR
Douglas Frank White
BY
ATTORNEY

United States Patent Office 3,221,662
Patented Dec. 7, 1965

3,221,662
METHOD AND APPARATUS FOR CONTROLLING FLOW IN CENTRIFUGAL MACHINES
Douglas Frank White, Bedminster, N.J., assignor to American Radiator & Standard Sanitary Corporation, New York, N.Y., a corporation of Delaware
Filed Feb. 14, 1963, Ser. No. 258,961
9 Claims. (Cl. 103—103)

This invention relates in general to centrifugal machinery including fans, blowers, pumps and compressors, and more particularly to methods and apparatus for controlling the flow of fluid in such machinery so as to increase the over-all efficiency and decrease the operational noise.

Recent studies have shown that the flow leaving the impeller blades of a centrifugal blower is grossly nonuniform, comprising a relatively high-velocity jet adjacent the pressure side of the blade and a relatively stagnant or low velocity fluid in the remaining intervening space between the blades. Moreover, it has been found that flow distortion of the type described occurs to a greater or lesser degree in all centrifugal fans, pumps and compressors.

This condition leads to several undesirable effects. The mixing of the fluid constituting the high-speed jet with the relatively stagnant fluid, designated the "wake," dissipates an appreciable amount of energy in an irreversible thermodynamical exchange which is noisy and inefficient requiring higher input power to obtain the same output from the device.

Accordingly, the primary object of this invention is to provide a more uniform outflow from the impeller channels in centrifugal machinery, and thereby to increase the efficiency and reduce operational noise in such devices.

In the prior art, attempts have been made to realize this object by placing a series of auxiliary vanes between the principal impeller blades, within their periphery, thereby cutting up the intervening space into a series of separate channels. This has the effect of reducing the efficiency of operation of such devices, since each of the interposed blades functions as a working blade which absorbs energy from the input source.

In accordance with the present invention, I have succeeded in substantially reducing the uneven character of fluid flow from the channels between the impeller blades in centrifugal machines by mounting a non-working, auxiliary vane beyond the periphery of each of the blades. The non-working vane comprises a surface so disposed ahead of the leading edge of the blade that its lateral edges form acute angles with radius vectors of the impeller which open inwardly, in the direction of the axis of rotation. The angle of inclination of the auxiliary vane is chosen to coincide as closely as possible with the principal tangent to a theoretical surface of pressure equilibrium between the high velocity jet and the low velocity wake flow, so that the high velocity jet striking the under surface of the auxilliary vane gives up part of its energy to the stagnant wake.

An important feature of this arrangement is that it provides a more even distribution of fluid velocities along the width of a given impeller channel, without the consumption of additional horsepower. Another important feature of the invention is a substantial reduction in the operating noise of the machine by practical elimination of turbulence resulting from the violent mixing of high-speed and low speed flows, and by greatly reduced velocity fluctuations in the housing at the cut-off point.

The principles of the invention have been found to apply in greater or lesser degree to all types of centrifugal fans, pumps, and compressors.

In a specific embodiment under description, the principles of the invention are applied to a simple, centrifugal fan, having a motor-driven impeller comprising a plurality of radial blades which suck air into a chamber adjacent the axis of rotation, and deliver a highly accelerated jet into an exhaust pipe beyond the periphery of the impeller blades. The impeller is clad, front and back, with a pair of shrouding surfaces. This structure is modified in accordance with the present invention by extending the shrouds a substantial radial distance beyond the peripheral edges of the blades, thereby forming an annular diffusing chamber for the accelerated stream of fluid. The extended shrouds serve as supporting edges for the fixed auxiliary vanes which, in a principal embodiment, are mounted ahead of the leading edges of the respective blades so that in each case the lateral vane edges contacting the shroud surfaces form substantially identical acute angles with a radius vector tangent to the said leading edge. By a special technique, described hereinafter, this angle is selected to approximate as closely as possible the tangent to a surface of pressure equilibrium in the streams of fluid shed by each impeller blade. The auxiliary vanes extend up to, but not within, a circle including the peripheral edges of the blades.

In a further modification, the auxiliary vanes comprise, instead of a single surface, a plurality of surfaces joined end to end, each of which is tangent to a portion of the pressure equilibrium surface, and which together more closely approximate its shape than the single surface. In a variation of this, the outer portion of the vane is removed, leaving an angularly disposed surface in the lower portion of the diffusion chamber which is substantially spaced from the leading edge of a respective blade in the direction of rotation.

A special modification is proposed for the case in which the impeller blades are backwardly curved, increasing the efficiency of the centrifugal machine, but at the same time substantially aggravating the distortion of the output velocity pattern, so that the high speed jet adjacent the leading edge of the blade is greatly extended. In such case, it is proposed in accordance with the present invention to channel the high speed jet between a pair of auxiliary blades in the diffusion chamber, one of which extends out from the leading edge of the blade, and the other of which is angularly disposed ahead of the leading edge in the direction of rotation, both vanes at angles approximating tangents to pressure equilibrium surfaces. Both of the aforesaid are non-working vanes.

Certain further advantages have been found to accrue, including a substantial reduction or elimination of a destructive oscillatory phenomenon called "swinging," where auxiliary vanes, approximating velocity equilibrium surfaces in accordance with the present invention, are mounted in the diffusion chamber formed by the shrouds in circumferential positions which are between, rather than immediately adjacent, the respective impeller blades. Using such an auxiliary vane configuration, I have found that the fluid-pressure in the machine decreases as a regular function of progressive increases in fluid flow. This contrasts sharply to the condition which obtains when the auxiliary blades are attached to or immediately adjacent the leading edges of the impeller blades, so that they become "working vanes," in which case, the fluid-pressure increases with increased fluid-flow up to a maximum, before decreasing.

These and other objects, features and advantages of the invention will be better understood from a detailed study of the specification hereinafter with reference to the attached drawings, in which:

FIGURE 1 is a schematic, cross-sectional showing of a portion of a typical centrifugal machine, in which the fluid velocity distribution from one of the impeller output channels has been indicated vectorially.

FIGURE 2 is a showing, similar to that of FIGURE 1, in which output fluid velocity distribution from one of the impeller channels has been modified by the presence of a fixed material surface of pressure equilibrium in accordance with the present invention.

FIGURE 3 is a perspective showing of a centrifugal machine in its casing, more specifically a scroll fan, together with driving means with reference to which the present invention will be described.

FIGURE 4A s a perspective showing of the impeller of the fan of FIGURE 3 with one of the shroud walls broken away to show the impeller blades and auxiliary vanes in accordance with a principal embodiment of the invention.

FIGURE 4B is an enlarged showing in perspective relative to the impeller blade, of an auxiilary vane in accordance with said principal embodiment.

FIGURES 4C, 4D, and 4E are showings similar to FIGURE 4B of modified configurations of auxiliary vanes in accordance with the present invention.

Figure 5:
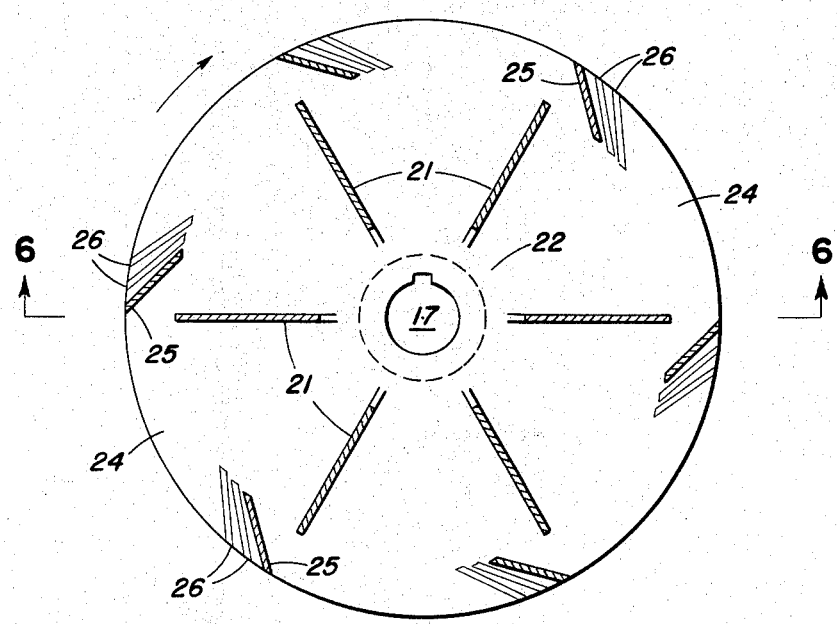

FIGURE 5 is a schematic, front-elevational view of the impeller and diffusion chamber of FIGURE 4A, including a view of the lateral edges of the auxiliary vanes.

Figure 6:
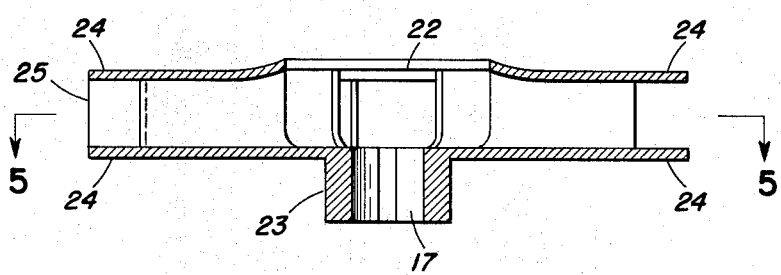

FIGURE 6 is a sectional view of the impeller along line 6—6 of FIGURE 5, showing the shrouds extended beyond the impeller blade peripheries in order to accommodate the auxiliary vanes in accordance with the present invention.

Figure 7:
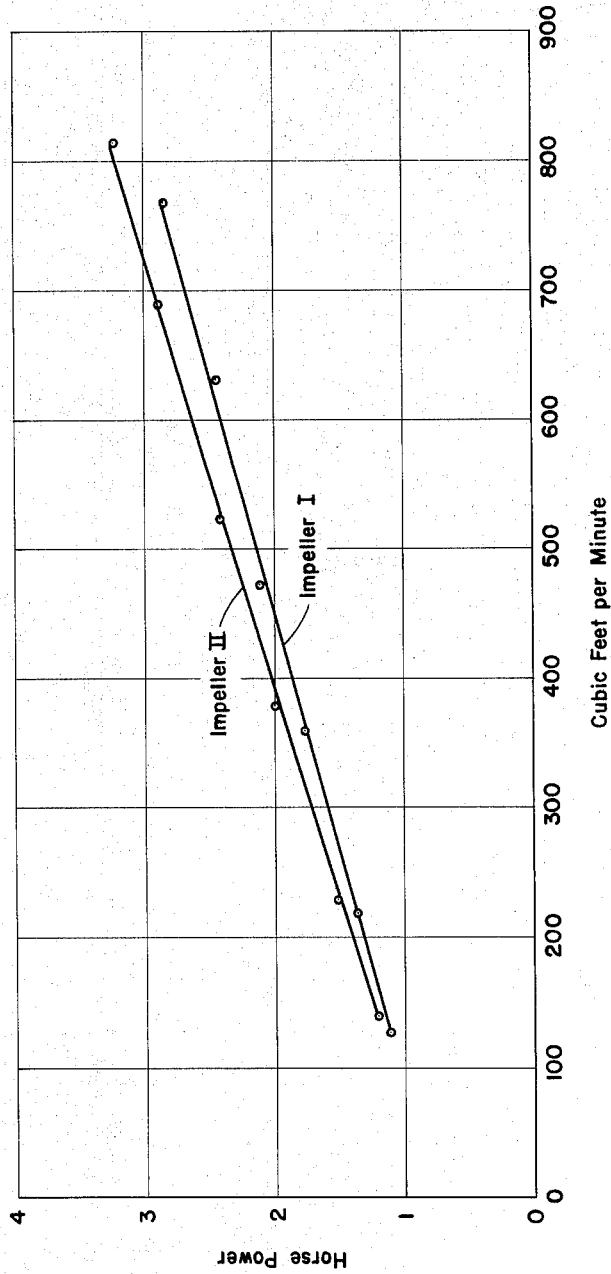

FIGURE 7 is a comparative plot of horsepower versus fluid flow in cubic feet per minute for a centrifugal fan including a prior-art type of impeller and one including an impeller modified to have shrouds extended out from the periphery of the blades, as in the present invention.

Figure 8:
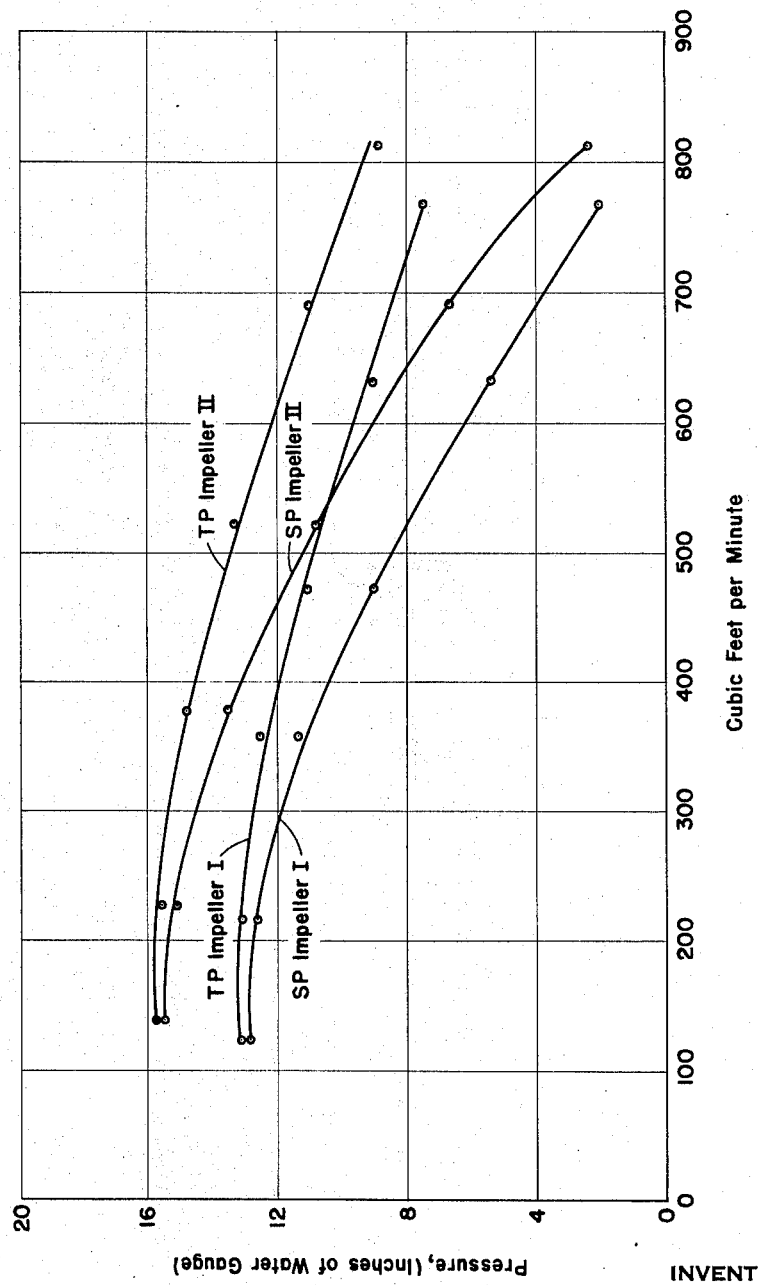
Figure 9:
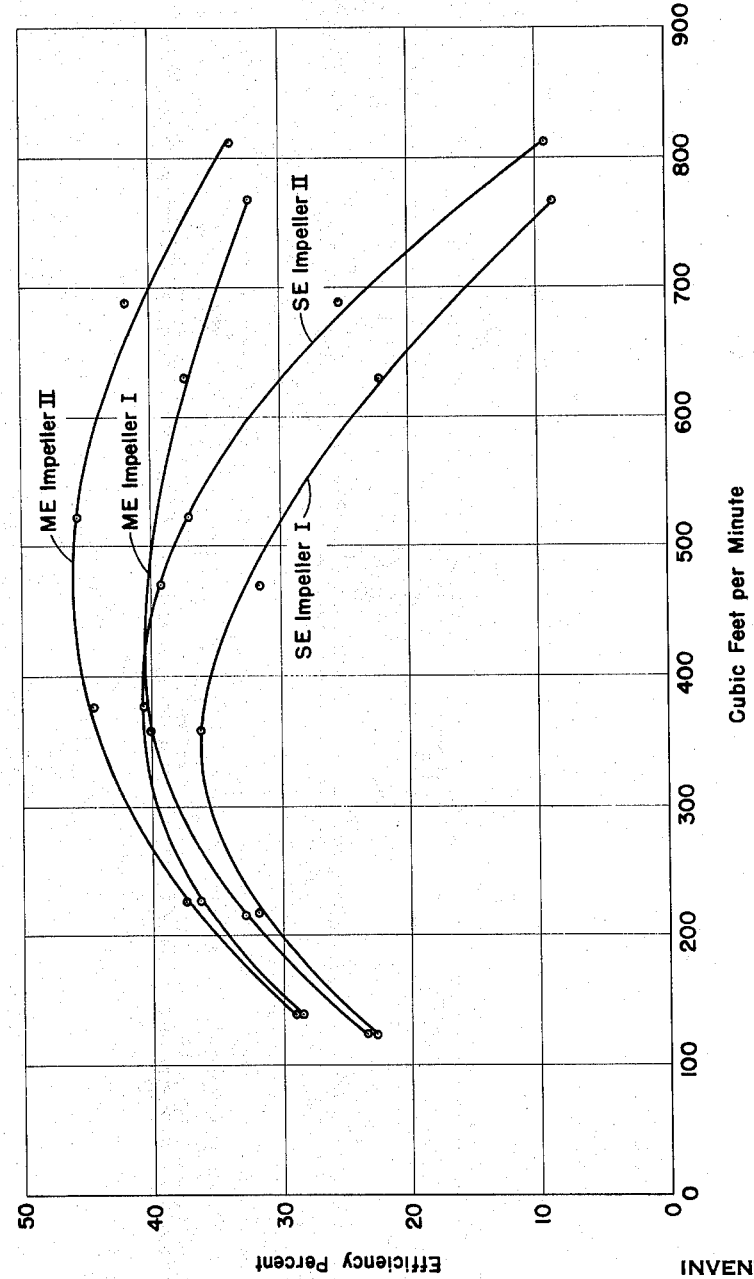

FIGURES 8 and 9 respectively show plots of pressure versus flow, and percentage efficiency versus flow comparing performances of the same two impellers referred to with reference to FIGURE 7.

Figure 10:
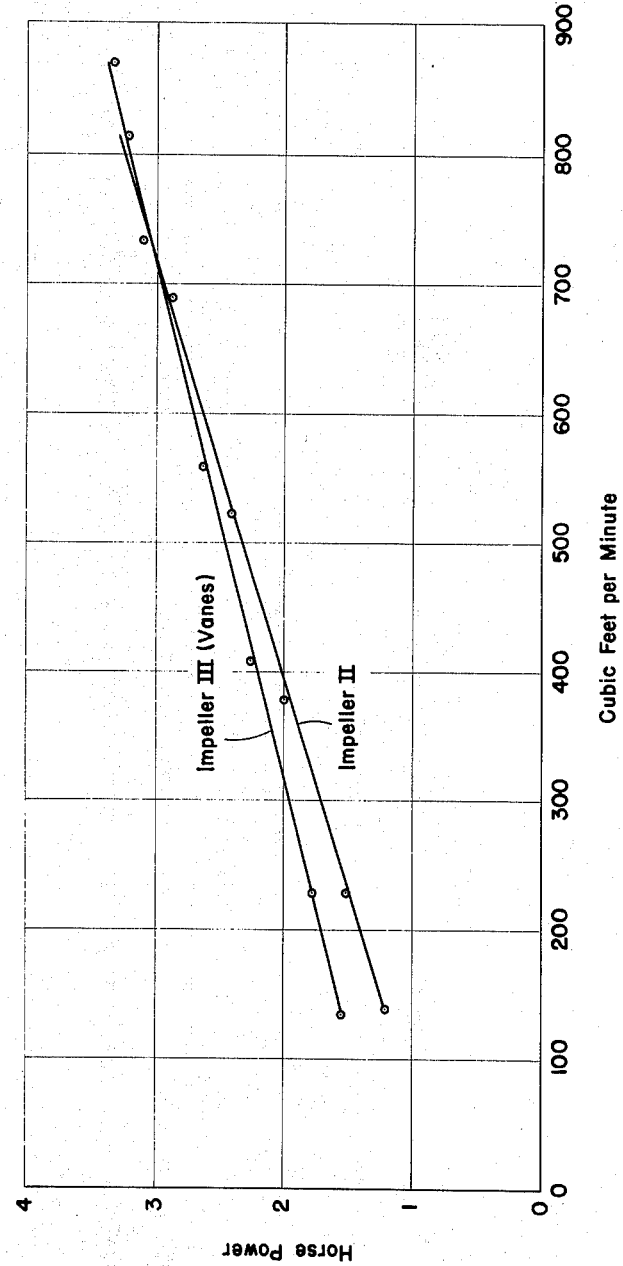
Figure 11:
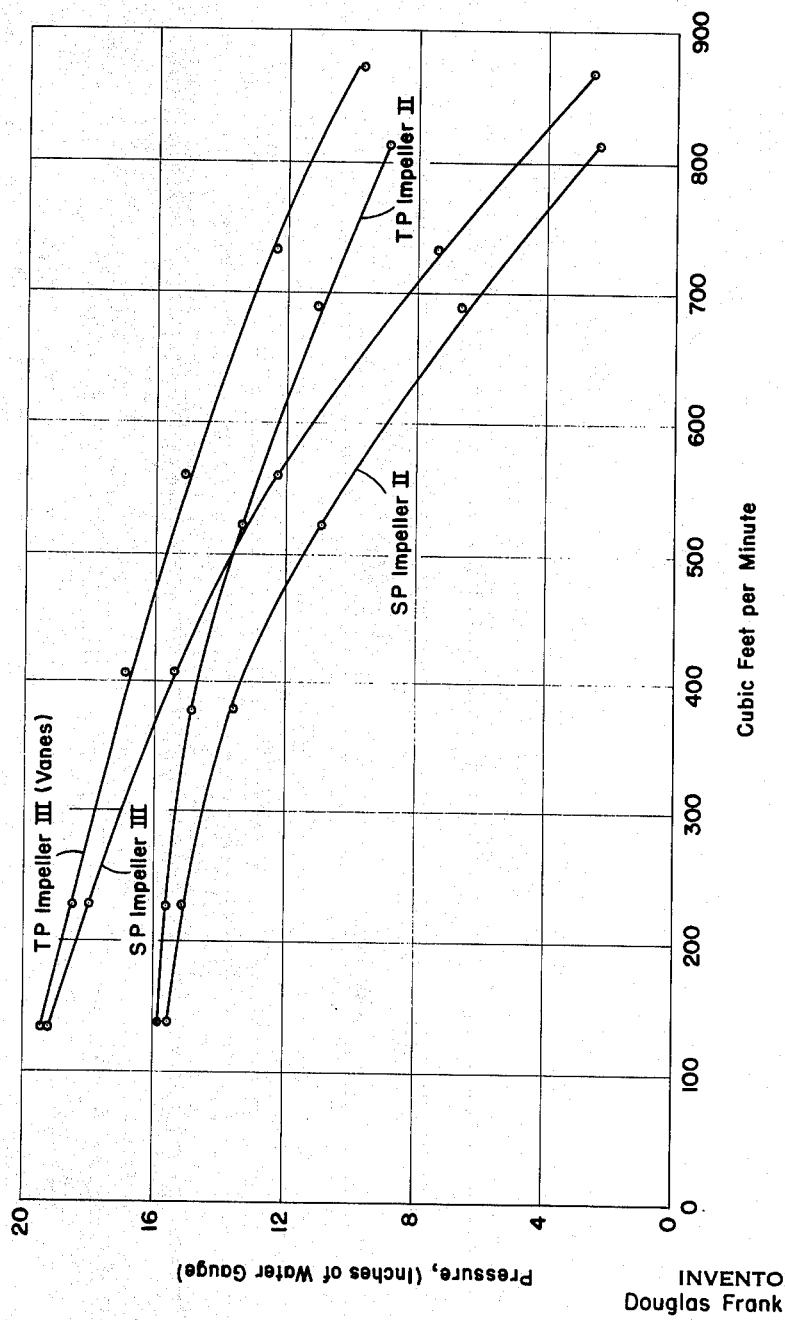
Figure 12:
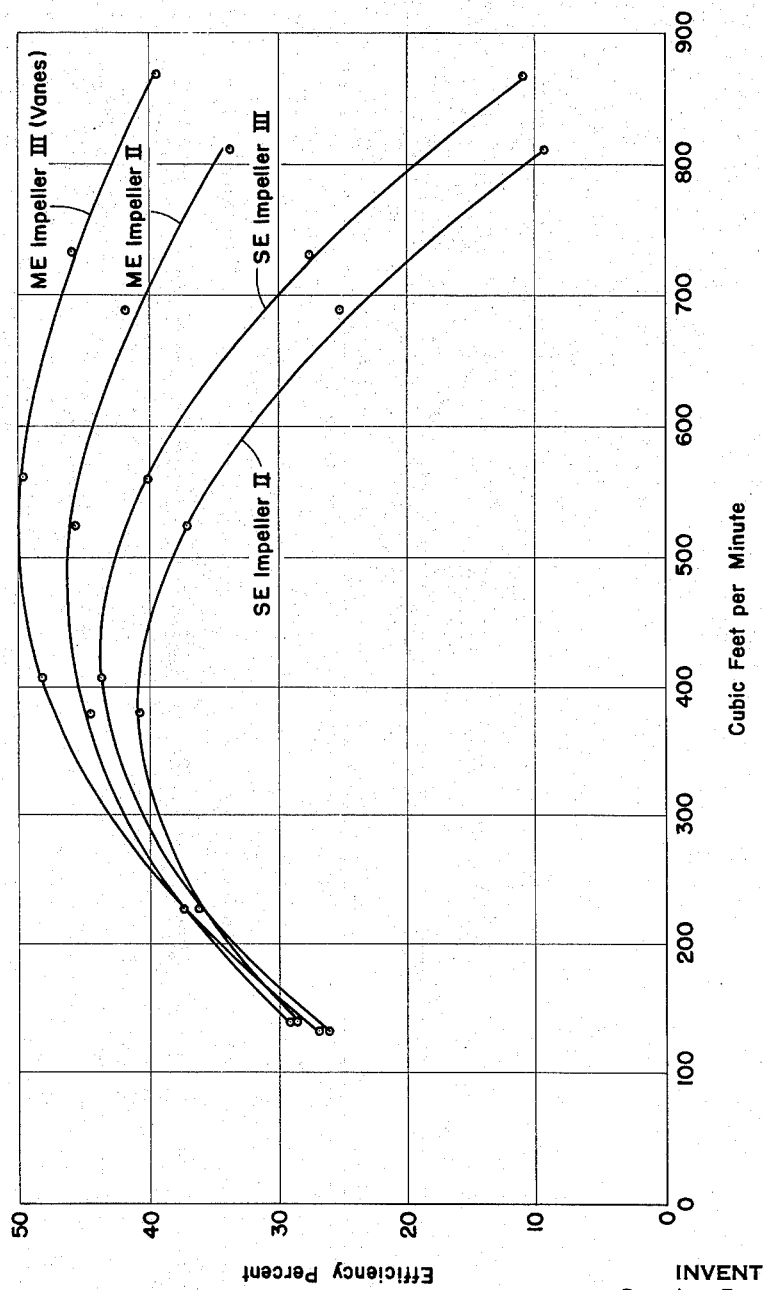

FIGURES 10, 11, and 12 are similar comparative plots of horsepower versus fluid flow, pressure versus fluid flow and percentage efficiency versus fluid flow respectively, for a centrifugal fan including impellers with respectively, for a centrifugal fan including impellers with respectively, for a centrifugal fan including impellers with extended shrouds, with and without angularly disposed auxiliary vanes constructed in accordance with the teachings of the present invention.

Figure 13:
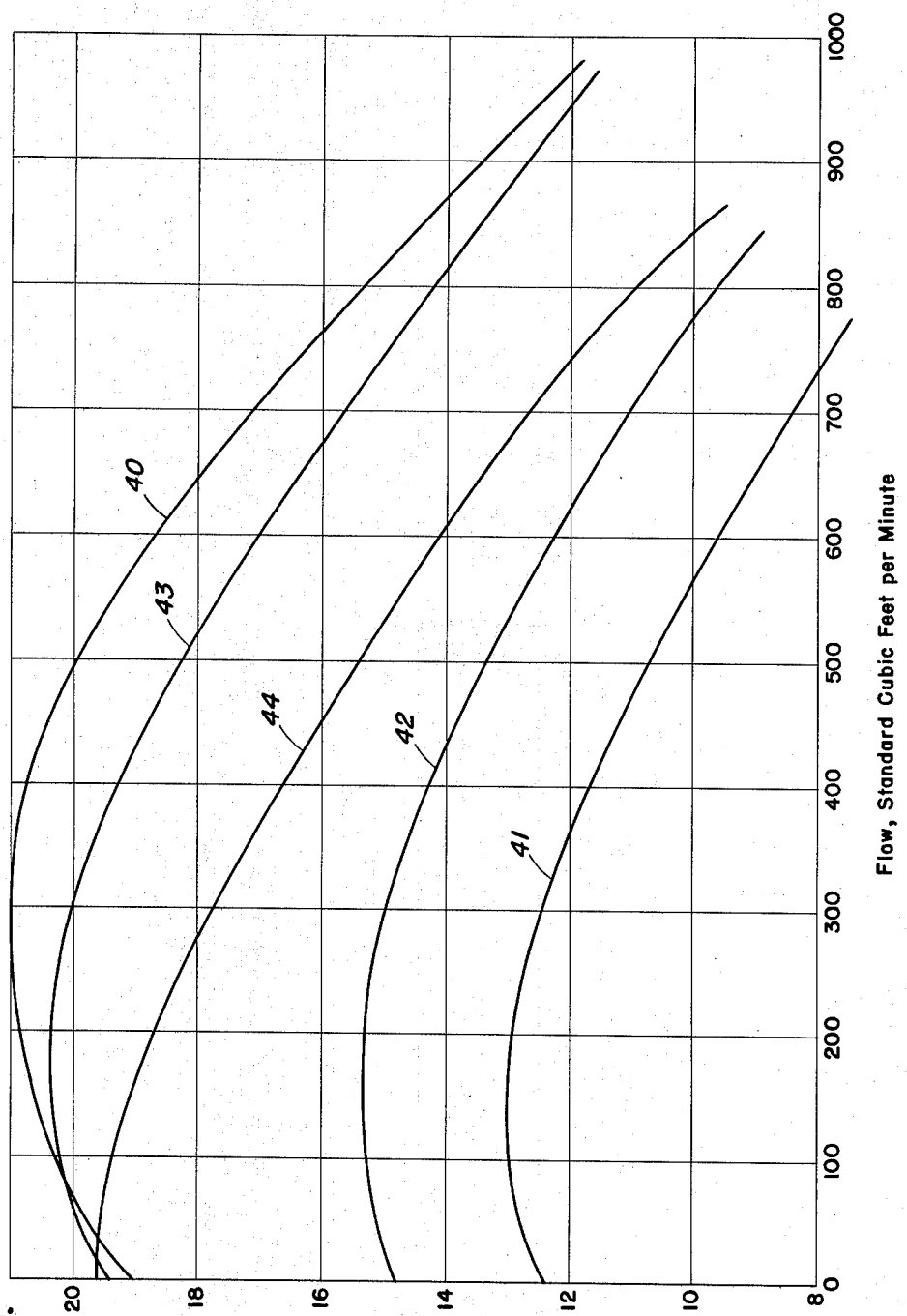

FIGURE 13 is a plot of pressure versus flow for several configurations of impeller blades, showing the advantage of spacing the auxiliary vanes circumferentially from the working impeller blades.

Referring to FIGURE 1 of the drawings which schematically shows a front-on view of a section of an impeller, 1 and 2 represent impeller blades which are rotating in a typical centrifugal fan in the direction indicated by the arrow. 4 represents the diffusion chamber formed by extending the shrouds outwardly in a radial direction from the peripheral edges or tips of the impeller blades. The chamber 4 is bounded on the inside by a circular path including the tips of impeller blades 1 and 2 and on the outside by the circle 5 representing the shroud periphery. As blades 1 and 2 rotate, assuming a speed of rotation, a jet 6 of high-speed fluid is shed by the leading edges 1 and 2.

The sharpness and duration of the high-speed jet 6 is a function of a number of variables including the revolutions per minute, volume of air (fluid) intake, and shaping of the impeller blades. In addition, to the jet 6, the remaining space in the diffusion chamber 4 adjacent the mouth of each impeller chamber is occupied by a wake 7 consisting of fluid of relatievly slow velocity.

Test data has shown that distorted flow of the type described, which is present to a degree in all centrifugal fans, pumps, and compressors, disappears at a small radial distance beyond the tips of the impeller blades. According to one hypothesis, this disappearance of flow distortion in a vaneless type of diffuser results from the turbulent mixing of the jet and wake flows.

This is detrimental to the performance of the machine for two reasons. First, such turbulent interchange is inevitably a highly dissipative process, substantially reducing the efficiency of the machine. Second, the mixing process produces fluctuations which contribute to the over-all noise level of the machine. In addition, the noise is greatly augmented by the unevenness of the discharge fluid as the impeller blades pass the cut-off point 12 in the volute chamber 14 beyond where it is connected to output pipe 18 (see FIGURE 3).

As previously pointed out, the objective of the present invention is to reduce the velocity of the sharply defined jet 6 and to raise the velocity of the low-speed wake flow, so as to even out the out-flow from the chambers between the impeller blades to a uniform velocity, as indicated ideally by the dotted line 8. Referring to FIGURE 2, this objective is carried out in theory by attaching a weightless, perfectly flexible vane 9 to the impeller shrouds beyond the periphery of the blades, in an angular position which coincides with assumed points of velocity discontinuity. In theory, the vane is free to move except along the lines where it is pivotally attached. It will be assumed that the width of vane 9 is matched to the depth of diffusion chamber 4 so that no side leakage occurs. In addition, for present purposes, viscous effects in the fluid are ignored, and turbulent velocity and pressure fluctuations are neglected.

In view of the foregoing assumptions, the only force which can act on vane 9 is pressure. Accordingly, the vane will automatically seek a fixed position of pressure equilibrium relative to the rotating impeller system such that the net pressure force on it at any point is zero.

Considering the path of a wake particle with reference to the rotating system, as it leaves the impeller passage, elementary reasoning shows it to be a spiral which tends to intersect the relative path, also spiral, of a high-speed jet particle leaving the same impeller passage. Without the added vane 9, it has been theorized that the previously mentioned mixing action occurs and accounts for the rapid, irreversible equalization of the velocities. When vane 9 and other identical vanes are in place adjacent each of the impeller blades, the aforesaid mixing is prevented, at least to the outer radius of the added vanes, and energy is exchanged by normal dynamic action. The high-speed jet flow, in effect, supports vane 9 in the manner indicated in FIGURE 2, causing wake particles to be deflected outwards, thus decreasing the radial component of velocity of the jet flow, and thus decreasing the difference in magnitude between the velocities of the jet and wake flows, which is the desired result.

An important feature of such an arrangement of auxiliary vanes is that within the stated assumptions, no additional input torque is necessary, since, as stated, the net pressure force on each of the vanes is zero. Thus, the vanes function to cause an exchange of energy in such a way as to produce a more uniform distribution of flow energy in a peripheral direction. In accordance with the theory of the present invention, separating vanes or membranes, such as vane 9, are needed to maintain the identity of the high-speed jet and the low-speed wake, so that they can interact without mixing.

From a practical standpoint, it is impossible to have a weightless, perfectly flexible vane, which can be held in place by pressure alone. However, it is possible, as the result of experiment, if in a particular application a fan or blower is operated at a constant condition, to approximate those surfaces on which the hypothetical vanes would lie. This can be done by pivoting a flap of lightweight, highly flexible plastic material, which may, for example, be a copolymer of vinyl chloride-acetate, between the impeller shrouds, beyond the peripheries of the blades, in such a position that the pivotal edge of the vane or flap intersects the tangent to the leading edge of the blade. Watching through a viewing window in the casing of the centrifugal machine as it rotates, an observer is able to note and crudely measure the optimum form and angle of deflection assumed by the flexible vane under varying conditions of operation.

Accordingly, a fixed, rigid vane can be formed to coincide with, or at least approximate the disposition of the theoretical pressure equilibrium surface.

FIGURE 3 of the drawings shows in perspective, in its casing, a typical centrifugal scroll-fan, of a type which has been modified in accordance with the present invention. In the specific embodiment under description, a type F, size 4, pressure fan, manufactured by the American Radiator and Standard Sanitary Corporation, was used. The fan assembly includes a simple induction motor 10, which for present purposes is 3-horsepower, and which drives the fan by means of a fan-belt which operates on the drive-shaft 17. In the present illustrative embodiment, two different sizes of fan sheaves have been employed to give the fan nominal speeds of 2,000 and 3,500 revolutions per minute.

The fan is housed in a cast-iron casing which includes the suction cover 13 centered on the drive-shaft 17, which, together with a similar back plate 13' (not shown) cover the front and rear of the impeller assemblage, which will presently be described in detail with reference to FIGURE 4A et seq. Cover plates 13, 13' are bolted or welded at their peripheries to matching flanges on the front and back inner circular edges respectively, of volute chamber 14, which is constructed to surround and enclose the periphery of the shrouded impeller assemblage, providing a nearly annular output chamber of gradually increasing circular cross-section, the large, open end of which is fitted to an exhaust pipe 18 beyond the cut-off point 12. The back plate 13' has an "eye," or circular opening about 6 inches in diameter for the purpose of air intake, which is centered on the impeller. On the opposite side of the casing, drive-shaft 17, supported in ball-bearing pillow blocks, is connected in driving relation to the impeller through a central opening in front plate 13 which accommodates a hub of the impeller.

For optimum performance of the centrifugal fan, it is noted that the size of the casing should be matched to the size of the impeller assemblage. In the present embodiment, plates 13, 13' form a chamber which is roughly 2 inches deep, and has an inner diameter of 20 inches. The communicating volute chamber varies from 3 to 4 inches in cross-sectional diameter. The large end of the volute chamber 14 is bolted with matching flanged edges flush with a pipe system 18 which terminates in a centered outlet orifice 19, the size of which is readily changed to control the air-pressure during operation of the fan. The motor and fan casing are mounted on a pedestal 15 which is bolted to the floor.

FIGURE 4A shows in perspective, with a portion of the shroud casing broken away, the impeller assemblage which is centered beneath the casing cover 13, 13' of FIGURE 3 and keyed for rotation to drive-shaft 17. This will be described together with FIGURES 5 and 6 which respectively show a schematic, front-on view of the impeller assemblage of FIGURE 4A, and a cross-sectional view along the line 6—6 of FIGURE 5.

Referring to FIGURE 4A, 5 and 6, the impeller in the present illustrative embodiment has six radial blades 21 mounted on a wheel arrangement 22 which is assembled in the casing shown in FIGURE 3 with its open face adjacent the eye of back plate 13', thereby providing an air-intake chamber. The other face of the wheel terminates in a concentric hub 23, keyed for rotation to the drive-shaft 17.

In the present embodiment, the impeller is formed of aluminum cast in a single mold, although it is apparent that other metals would be also suitable. The blades 21, which in the original mould of the impeller were 9 inches in radial extent from the center of the impeller, 1 inch wide, and ¼ inch in thickness at their ends, were machined 1½ inches down from their ends, leaving shrouds 24, ¼ inch thick, extending beyond the blades in a radial direction of the front and rear faces of the impeller, to form an annular diffusing chamber beyond the peripheries of the blades, which rotates with the blades.

In accordance with the present invention, a plurality of auxiliary vanes 25, comprising flat pieces of aluminum 1 inch wide, 2⅛ inches long, and ¹⁄₁₆ inch thick, are each mounted in a pair of matching slots 26 which are one of a plurality of pairs of slots machined on opposite inner surfaces of the shrouds 24 adjacent the tips of blades 21, to accommodate the vanes in different desired angular positions. It will be apparent that auxilliary vanes 25 can be formed of any other metal, in addition to aluminum, or for that matter, any material sufficiently rigid to retain its shape in rotation. Moreover, instead of being accommodated in slots 26, which is a mere convenience for holding the vanes 25 in different desired positions, the latter can be welded or otherwise secured in position; or the vanes, shrouds and blades can be cast or moulded as a single, integrally formed impeller.

In a preferred embodiment, the outer edges of vanes 25 extend to the peripheries of shrouds 24 on both sides intersecting the latter at points which are aligned with the radius vector which is tangential to the pressure sides of impeller blades 21, that is, the leading edges in the direction of rotation. Looking at FIGURE 5, the angle at which each of vanes 25 intersects the aforesaid radius vector is an acute angle extending ahead of the blade in the direction of rotation, and opening inwardly. If the direction of the radius vector is made a positive direction of reference, from which angles are measured, each of the lateral edges of vanes 25 contacting a shroud 24 would form an acute third-quadrant angle with the said radius vector, assuming clock-wise rotation of the impeller. The optimum angle at which the vanes 25 are disposed with reference to the radius vector will be chosen in the manner previously described with reference to FIGURE 2, so that it approximates the angle formed by the tangent to an equilibrium pressure surface in the fluid flowing in the diffusion chamber, under the desired condition of rotation.

In one embodiment, in which the impeller was operated at a normal rotational speed of 3,500 revolutions per minute, satisfactory results were obtained when vanes 25 were arranged so that the lateral edges thereof contacting the shroud surfaces 24 formed angles of 45 degrees with the radius vector tangential to the leading edge of each of blades 21. (Measuring from the positive reference direction of the radius vector, this would be an angle of 225 degrees, assuming the impeller to be rotating clockwise.) In preferred form, each of vanes 25 extends the entire width between the shrouds 24, and a diagonal length which intersects but does not penetrate the circle including the peripheral edges of impeller blades 21.

In accordance with a modification of the invention which is shown in FIGURE 4C of the drawings, the auxiliary vanes can be made in two (or more) flat sections, 27 and 28, instead of the single section 25 previously shown. The outer section 27, is mounted between the shrouds 24 in the manner previously described, so that the lateral edges thereof make acute angles with the radius vector tangent to the leading edge of the blade. Section 27 extends diagonally across the upper part of the radial width of the diffusion chamber where it is joined end-to-end to section 28, which extends to, but not within, the circle which includes the peripheries of impeller blades 21.

The lower plane 28 is rotated through a slight clockwise angle with respect to plane 27 so that the projection of its lateral edges contacting shrouds 24 would make, in each case, a more acute angle than those formed by plane 27 with the radius vector. It will be apparent that the angles of the two surfaces or for that matter, more than two, can be adjusted so that the composite more closely approximates the position of the isobar or pressure equilibrium surface than a single surface. A further modification of the embodiment of FIGURE 4C can be achieved by removing the outer section 27 altogether, leaving only the inner section 28. In such case, it will be apparent that the outer edge of section 28 does not intersect the radius vector tangential to the leading edge of blade 21, but is spaced therefrom in the direction of rotation, and in a position to intersect fluid particles in only the inner portion of the diffusion chamber formed by the shrouds 24. Such an arrangement has been found to be effective in intersecting and channelling the high-velocity jet.

Still another modification is shown in FIGURE 4D of the drawings, which makes use of the principle of channelling or isolating the high-velocity jet from the wake. In accordance with such an arrangement, two auxiliary vanes, 29 and 30 are mounted between the shrouding surfaces 24 in the diffusion chamber, the vane 29 extending out from the leading edge of impeller blade 21 at an acute angle with a tangent thereto, and the vane 30 spaced in a rotational direction from the tangent to the leading edge, and again forming an acute angle with a radius vector of the impeller. Both vanes 29 and 30 approximate principal tangents to pressure equilibrium surfaces. This embodiment would be most useful in cases of gross distortion or enlargement of the high-velocity jet, such as those in which the impeller blades are backwardly curved to increase efficiency.

A further modification of the auxiliary vane arrangement of the present invention is indicated in FIGURE 4E of the drawings, wherein the single auxiliary vane 25 of FIGURES 4A, 4B is replaced with a pair of auxiliary vanes 31 and 32, beyond the periphery of the impeller blade 21, and at spaced circumferential positions which are ahead of and substantially separated from the leading edge of blade 21 in the direction of rotation. Each of auxiliary vanes 31 and 32 is positioned to approximate the tangent to a pressure equilibrium surface, chosen in the manner previously described. The function of such an auxiliary vane in a position substantially removed in a circumferential direction from the vicinity of the working impeller blade is to increase the efficiency of the machine while absorbing little or none of the input energy.

This will be better understood after a study of the test results illustrated in FIGURE 13, which will be discussed hereinafter. The positions of such non-working auxiliary vanes differ, for optimum effectiveness according to the impeller configuration and speed; and they may be used singly, in pairs as shown, or even in larger groups. In any case, each such auxiliary vane or group of vanes still has the principal function of rendering the fluid output more uniform from the chambers between the impeller blades; and the positioning thereof will represent a compromise between that function and the one of increasing the efficiency of the machine by causing a reduction in the total fluid pressure with flow, as shown in FIGURE 13.

A number of tests have been performed using structures built in accordance with the present invention which are indicative of its advantageous features.

The first tests were run using as a control, a standard 15 inch diameter impeller (impeller I) operating at a nominal speed of 3,500 revolutions per minute; and a second impeller (impeller II) having an original outside diameter of 18 inches, which was modified by machining 1.5 inches off of each of the blade tips, leaving the shrouds in place. Thus, the configuration of impeller II is shown in cross-section in FIGURE 6, omitting auxiliary vanes 25. It differs from impeller I only in that it includes a parallel-walled, vaneless rotating diffuser extending 1.5 inches beyond the peripheral edges of blades 21.

The test set-up included the over-all combination shown and described with reference to FIGURE 3, using a type F, size 4 pressure fan, manufactured by the American Radiator and Standard Sanitary Corporation, which was mounted on a pedestal bolted to the laboratory floor. The discharge duct 19 on the exhaust pipe 18 was adjusted to a size prescribed by the Air Moving and Conditioning Association Standard Test Code for Air Moving Devices, bulletin 210, September 1960. Provisions were also made for measuring pressure and flow according to the latter code. Torque was read directly in inch-pounds by means of a torquemeter which was installed between the bearings of the drive shaft. Fan speed was measured by a General Radio Strobescope known by the trade name "Strobotac." Each of the experiments described was performed at a nominal speed of 3,500 revolutions per minute, using air as the working fluid. A General Radio Sound Level Meter, type 1551–C, was used to record over-all sound pressure level in the near vicinity of the fan.

The results of these control tests appear in FIGURES 7, 8 and 9, which are comparative graphical showings of the effect of shroud extensions alone on output power, pressure and efficiency, respectively, of the centrifugal test system. The test data were reduced to standard conditions in the manner set forth in the Air Moving and Conditioning Association Test Code, supra.

Whereas from FIGURE 7, which shows horsepower plotted against flow in cubic feet per minute for each of impellers I and II, it is apparent that impeller II, including the extended shrouds, consumes more input power than impeller I, the accompanying increase of pressure more than compensates for the additional input power, giving a higher efficiency over the entire flow range. This is brought out in FIGURES 8 and 9. FIGURE 8 shows pressure in inches of water gauge plotted against air flow in cubic feet per minute, for static pressure and total pressure in each case. FIGURE 9 shows a comparison of percentage efficiency, moving and static, plotted against flow rate for impellers I and II.

The second series of tests was performed after impeller II was further modified in the manner indicated in FIGURES 4A, 4B, 5 and 6 of the drawings, to form impeller III by inserting six flat vanes of aluminum sheet 1/16 of an inch thick into slots 26 machined on the inside surfaces of the shrouds 24. In the test system the vanes 25 were of such a width as to be flush with the edges of shrouds 24. Vanes 25 were disposed in each case so as to intersect the radius vector tangent to the leading or pressure side of a respective impeller blade 21 at an arbitrarily selected angle of 45 degrees (225 degrees as measured from the positive direction of the radius vector, assuming the impeller to be rotating clockwise). Thus, impellers II and III, which both included extended shrouds, were identical except for the added vanes.

FIGURES 10, 11 and 12 of the drawings show comparative performance curves for impellers II and III, corresponding to the previously described curves of FIGURES 7, 8 and 9.

In FIGURE 10, which shows horsepower plotted against flow in cubic feet per minute, the principal item of interest in the cross-over point between the curves of impellers II and III. Recalling that the theoretical concept implies different locations of surfaces of pressure equilibrium for different operating conditions of a particular fan, the interpretation given to the result of FIGURE 10 is that the selected vane configuration was operating as intended near the maximum capacity of the experimental fan. It is apparent that at the lower flow rates, the added vanes 25 result in higher power input than for impeller II.

FIGURE 11 shows both total and static pressures measured in inches of water gauge plotted against flow in cubic feet per minute for impellers II and III. It is apparent from these curves that a considerable gain in pressure results from the added vanes over the entire flow range, including the point where the power input for both impellers is equal.

Clearly, an increase in pressure without a corresponding additional power requirement is very strong evidence of the validity of the theoretical concept of the present invention; and that vanes added in accordance with these teachings are very beneficial to fan performance.

FIGURE 12 shows percentage efficiency, moving and static, plotted against flow rate for impellers II and III. Except at very low flow rates, it is seen that the vanes added in accordance with the present invention give higher efficiency, the incremental improvement increasing with increasing flow rate.

FIGURE 13 of the drawings is a plotting of total fluid pressure in inches of water gauge against flow-rate in cubic feet per minute for various impeller configurations in the machine previously described. These curves show that certain advantages are to be derived from positioning the auxiliary vanes so that they are substantially removed in a circumferential direction from the leading edges of the respective impeller blades. Curves 40, 41, and 42 are control tests respectively, using an 18 inch diameter impeller blade, and a 15 inch diameter impeller blade, the latter without and with shroud extensions. Curve 43 shows test results when auxiliary vanes similar to those previously described, mounted in shrouds at angles of 45° with respect to the radius vector, are positioned with their inner ends immediately adjacent the tips of each of the 15 inch diameter impeller blades, so that they absorb a portion of the input energy (see 29, FIGURE 4D). Curve 44, on the other hand, shows the condition which obtains when auxiliary vanes mounted in the manner taught herein at acute angles of 45°, are spaced a distance corresponding to about 6 degrees in arc circumferentially in the directive of motion from the leading edges of the respective 15 inch diameter impeller blades. (see FIGURE 4E, vane 32). Thus, these auxiliary vanes are positioned in between, and not immediately adjacent the working impeller blades. In such positions, test data shows that they absorb practically none of the energy delivered to the input of the centrifugal machine; and that as indicated by curve 44, the fluid-pressure constantly decreases, even at low flow-rates, instead of first increasing to a maximum, as indicated in curves 40 through 43. This shows the latter configuration to be more efficient than those previously disclosed, as the energy absorbed is minimal.

The present invention has been described with reference to certain illustrative embodiments. However, it will be apparent to those skilled in the art that the scope of the invention is not restricted to any particular materials, forms or combinations of elements shown herein by way of illustration; but that rather the scope of the invention is to be measured by the appended claims.

What is claimed is:

1. In a centrifugal machine having an intake chamber, an exhaust chamber, a source of fluid communicating with said intake chamber, an impeller comprising at least one radial blade having a leading edge and a trailing edge mounted for rotation about a central axis adjacent said intake chamber, the leading edge being spaced radially outward from the axis of rotation, the trailing edge being spaced radially outward therefrom, said impeller constructed upon rotation to derive fluid from said intake chamber and deliver a jet of said fluid which has been centrifugally accelerated to said exhaust chamber, at least one auxiliary vane having a leading edge and a trailing edge fixed relative to said vane positioned beyond the periphery of and ahead of said impeller blade such that it approximates the angle formed by the tangent to an equilibrium pressure surface in the fluid, the leading edge of the vane being positioned ahead of the blade and on an arc of a circle incorporating the peripheral edge of the blade, and the trailing edge of the vane positioned beyond the end of the blade and radially aligned with the leading edge of said blade.

2. A combination in accordance with claim 1 wherein said vane approximates an angle of 45 degrees with said blade.

3. A combination in accordance with claim 1 wherein said impeller includes a plurality of blades symmetrically mounted for rotation about a central axis, and wherein the auxiliary vanes are fixed rigidly relative to each blade and positioned beyond the periphery of and ahead of the associated impeller blades in the direction of rotation of said impeller.

4. A combination in accordance with claim 1 wherein the width of said auxiliary vane in a plane normal to the plane of rotation substantially coincides with that of said impeller blade.

5. A combination in accordance with claim 1 wherein said auxiliary vane comprises at least two surfaces disposed end-to-end, rigidly supported beyond the periphery of and ahead of said impeller blade in the direction of rotation, and lateral edges of each of said surfaces forming with respect to a radius vector of said impeller acute angles which open inwardly, and wherein the angle formed by a second said surface is smaller than the angle formed by said first surface.

6. A combination in accordance with claim 5 wherein the outer edge of the first said surface intersects a radius vector tangential to the leading edge of said impeller blade, and wherein said second surface extends to but not beyond the circle including the periphery of said impeller blade.

7. A combination in accordance with claim 1 wherein said auxiliary vane comprises a surface disposed beyond the periphery of and ahead of said impeller blade in the direction of rotation, wherein the trailing edge of said surface is substantially spaced in the direction of rotation from the radius vector tangential to the leading edge of said impeller, and wherein the leading edge of said surface extends to but not beyond the circular path including the periphery of said impeller blade.

8. A combination in accordance with claim 7 which includes a plurality of auxiliary vanes disposed beyond the periphery of and ahead of said impeller blade in the direction of rotation, each of said vanes at a different circumferential location with reference to the leading edge of said impeller blade.

9. A combination in accordance with claim 8 which includes one said auxiliary vane extending outward from the tip of said impeller blade at an acute angle to the tangent to the leading edge of said blade, said auxiliary vanes serving to channel the jet of fluid immediately adjacent said leading edge.

References Cited by the Examiner

UNITED STATES PATENTS

| 588,513 | 8/1897 | Ward | 230—127 |
|---|---|---|---|
| 1,029,554 | 6/1912 | Neumayer | 230—127 |
| 2,165,808 | 7/1939 | Murphy | 103—115 |
| 2,429,878 | 11/1947 | Blanchard | 103—95 |
| 2,753,808 | 7/1956 | Kluge | 103—115 |

FOREIGN PATENTS

| 343,288 | 10/1904 | France. |
| 889,341 | 9/1943 | France. |
| 1,058,690 | 11/1953 | France. |
| 1,227,952 | 3/1960 | France. |
| 573,559 | 4/1933 | Germany. |
| 27,286 | of 1903 | Great Britain. |
| 180,299 | 10/1922 | Great Britain. |
| 524,703 | 8/1940 | Great Britain. |
| 864,645 | 4/1961 | Great Britain. |

DONLEY J. STOCKING, *Primary Examiner.*

JOSEPH H. BRANSON, Jr., KARL J. ALBRECHT,
*Examiners.*